United States Patent [19]

Fukaya et al.

[11] 4,227,127
[45] Oct. 7, 1980

[54] MOTOR SPEED CONTROL CIRCUIT HAVING IMPROVED STARTING CHARACTERISTICS

[75] Inventors: Hirokazu Fukaya; Jun Kishi, both of Tokyo, Japan

[73] Assignee: Nippon Electric Co., Ltd., Tokyo, Japan

[21] Appl. No.: 962,256

[22] Filed: Nov. 20, 1978

[30] Foreign Application Priority Data

Nov. 21, 1977 [JP] Japan .............................. 52/138896

[51] Int. Cl.$^2$ ......................... H02P 1/00; H02P 5/16
[52] U.S. Cl. .................................. 318/317; 318/331; 318/459
[58] Field of Search ............... 318/341, 317, 331, 264, 318/272, 430, 450, 459; 307/297; 323/22 T, 40

[56] References Cited

U.S. PATENT DOCUMENTS

| | | | |
|---|---|---|---|
| 3,803,471 | 4/1974 | Price et al. .......................... | 307/297 |
| 3,943,380 | 3/1976 | Morgan et al. ..................... | 307/297 |
| 3,962,592 | 6/1976 | Thommen et al. .................. | 307/297 |
| 3,991,323 | 11/1976 | Przybylski ........................... | 307/297 |
| 4,064,448 | 12/1977 | Eatock ................................. | 307/297 |

*Primary Examiner*—David Smith, Jr.
*Attorney, Agent, or Firm*—Sughrue, Rothwell, Mion, Zinn and Macpeak

[57] ABSTRACT

A motor speed control circuit includes a resistor, a voltage reference circuit, a first voltage comparator, a current mirror circuit for deriving first and second output currents according to the output of the first voltage comparator, and a motor. A voltage consisting of the sum of a reference voltage and a voltage generated across the resistor by the first output current of the current mirror circuit is applied to the first input terminal of the first voltage comparator. The second output current of the current mirror circuit is fed to the motor and to the second input terminal of the first voltage comparator. A second comparator detects the voltage difference between the first and second input terminals of the first voltage comparator. The output of the second comparator is applied to the current mirror circuit to enhance the starting torque of the motor.

12 Claims, 10 Drawing Figures

U.S. Patent  Oct. 7, 1980  Sheet 1 of 3  4,227,127
FIG 1
PRIOR ART
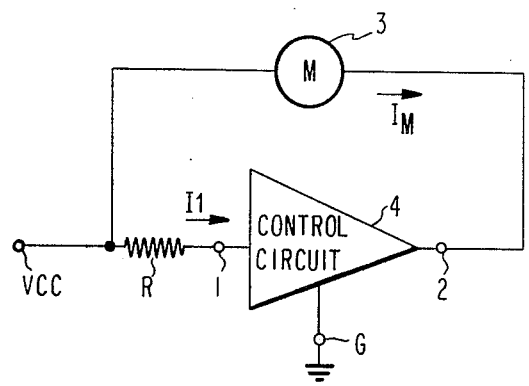
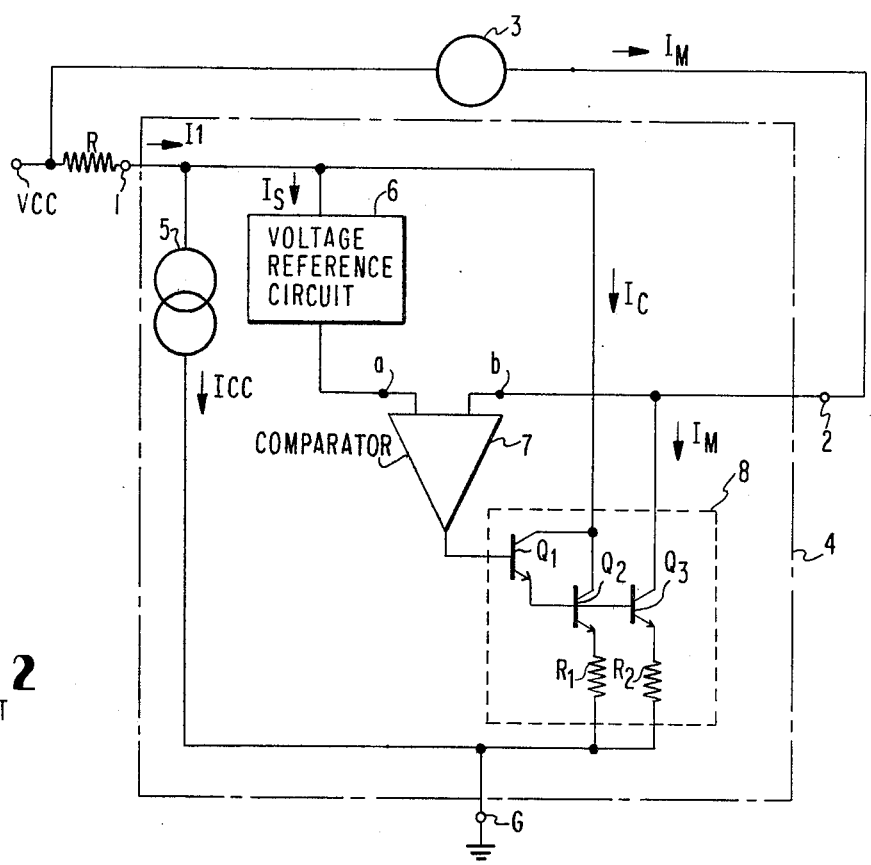
FIG 2
PRIOR ART
FIG 3(a)
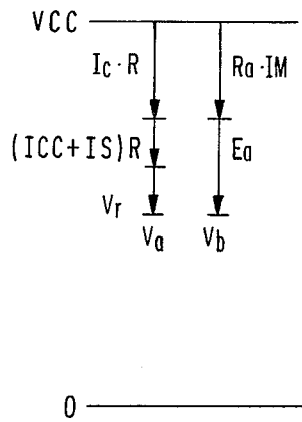
FIG 3(b)
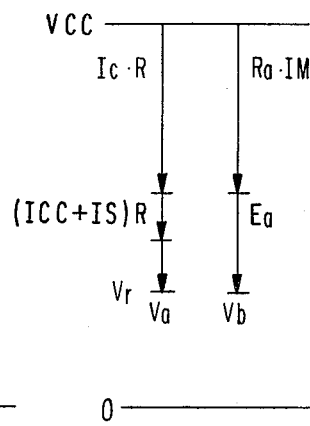
FIG 3(c)
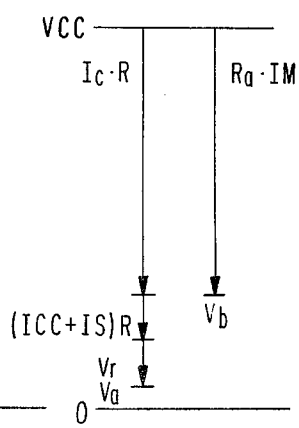

MOTOR SPEED CONTROL CIRCUIT HAVING IMPROVED STARTING CHARACTERISTICS

The present invention relates to a motor speed control circuit which performs electronic control.

As to the motor speed control circuits in the prior art, a voltage control system and a current control system are known. Among these systems, the current control system has such construction that a power supply voltage is applied to one input terminal of a comparator through a resistor having a resistance that is at a given ratio to a resistance of an internal resistance of a motor and a voltage reference circuit which generates a constant voltage that is controlled so as to obtain a predetermined rotational speed. The motor is connected between the other input terminal of the comparator and the terminal of the power supply voltage, and the output of the comparator generates electric currents which are proportional to each other and flow through the resistor and the motor, respectively. In this case, through the resistor flows a sum of the current flowing through the motor and the current flowing through the voltage reference circuit (in some cases, another constant current is additionally made to flow), and the circuit parameters are so designed that the voltage drop generated across the resistor by the current caused to flow by the output of the comparator may be equal to the voltage drop generated across the internal resistance of the motor by the current caused to flow by the output of the comparator. In addition, since the comparator derives a comparison output so as to equalize the voltages at the respective inputs, the respective input voltages of the comparator are always maintained substantially equal to each other. Here it is to be noted that the voltage applied to the above one input terminal of the comparator is equal to the sum of the voltage drop across the resistor generated by the current made to flow by the comparator output, the voltage drop across the resistor generated by the current flowing through the voltage reference circuit (in some cases, another constant current is further added) and the reference voltage across the voltage reference circuit, while the voltage applied to the other input terminal of the comparator is equal to the sum of the voltage drop across the internal resistance of the motor generated by the comparator output and the counter electro-motive-force across the motor. Accordingly, by equalizing the respective input voltages to each other, the counter electro-motive-force across the motor is made to be equal to the sum of the voltage drop across the resistor generated by the current flowing through the voltage reference circuit (in some cases, another constant current is further added) and the reference voltage across the voltage reference circuit. Since the voltage drop across the resistor generated by the current flowing through the voltage reference circuit is small, the counter electro-motive-force across the motor becomes constant, and accordingly, the rotational speed of the motor is kept constant. If it is desired to vary the rotational speed of the motor, it can be achieved by varying the reference voltage across the voltage reference circuit or by making an additional constant current flow through the resistor.

The motor speed control circuits of the above-described type in the prior art have a disadvantage that the current made to flow through the motor upon starting by switching on the power supply has a value of the power supply voltage minus the minimum output voltage determined by the circuit construction divided by the resistance added to the power supply voltage terminal, and consequently, a sufficient starting torque cannot be attained.

SUMMARY OF THE INVENTION

It is one object of the present invention to provide a motor speed control circuit having improved starting characteristics which can afford a large initial starting torque to a motor by adding a simple circuit.

According to the present invention, there is provided a motor speed control circuit including a resistor, a voltage reference circuit, a first voltage comparator having first and second input terminals, a current mirror circuit for deriving first and second output currents according to the output of the first voltage comparator, and a motor. A voltage consisting of the sum of a reference voltage and a voltage generated across the resistor by the first output current of the current mirror circuit is applied to the first input terminal of the first voltage comparator. The second output current of the current mirror circuit is fed to the motor and to the second input terminal of the first voltage comparator, and thereby the rotational speed of the motor can be controlled. The invention is characterized by a second comparator for detecting the voltage difference between the first and second input terminals of the first voltage comparator. The output of the second comparator is applied to the current mirror circuit, whereby control can be achieved so as to enhance the starting torque of the motor.

According to the present invention, since the increase of the voltage difference between the first and second input terminals of the first comparator upon starting can be detected by the second comparator and thereby the current made to flow through the motor by the first comparator can be increased, a sufficient starting torque is given upon starting of the motor. Also, since the circuit parameters of the second comparator are determined so that the second comparator may not generate an output upon steady operation when the two input voltages of the first comparator are substantially equal to each other, the normal speed control of the motor would not be disturbed by the second comparator. In addition, when the load applied to the motor is so increased that the first comparator has become unable to achieve speed control, the speed of the motor can be controlled by the second comparator.

BRIEF DESCRIPTION OF THE DRAWINGS

The above and further objects, features and advantges of the present invention will become more apparent from the following detailed description of the several embodiments taken in conjunction with the accompanying drawings, wherein:

FIG. 1 is a basic diagram of a motor speed control circuit according to a current control system in the prior art;

FIG. 2 is a circuit diagram showing a more detailed example of the motor speed control circuit in the prior art shown in FIG. 1;

FIGS. 3(a), 3(b) and 3(c) are diagrams showing the relations between control voltages upon light loading, heavy loading and starting, respectively, of a motor in the motor speed control circuit in the prior art shown in FIG. 1;

DESCRIPTION OF THE PRIOR ART

Figure 4:
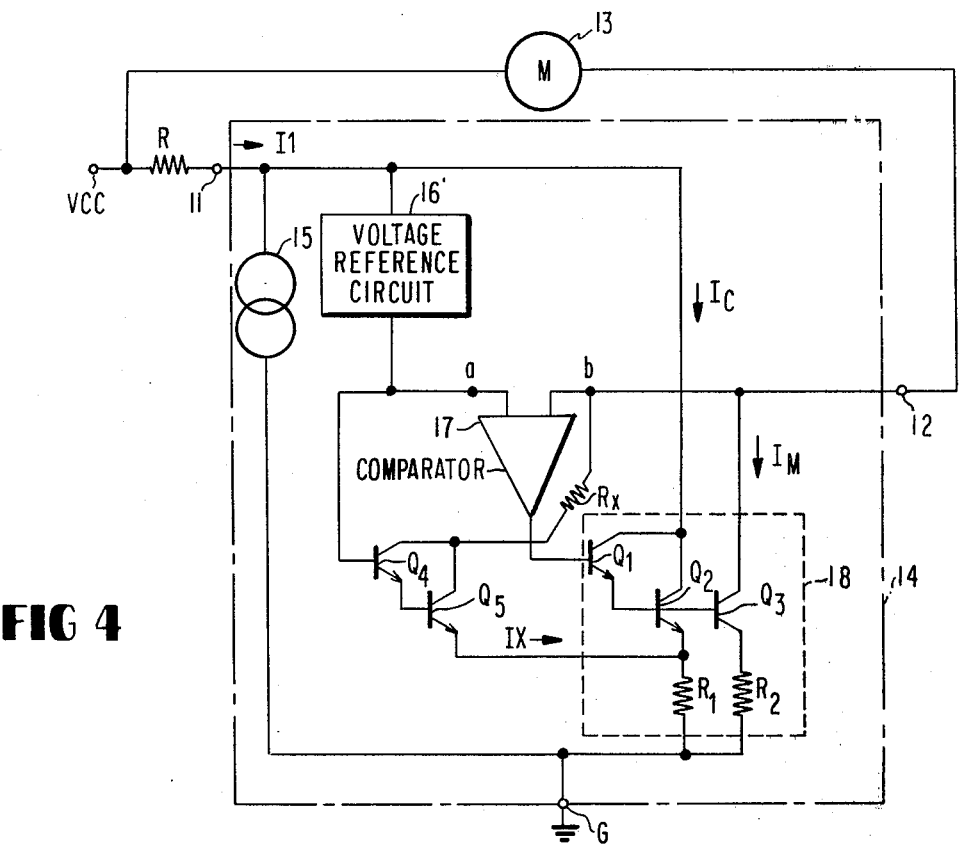
FIG. 4 is a circuit diagram showing a first preferred embodiment of the motor speed control circuit according to the present invention.

A motor speed control circuit according to a current control system in the prior art is constructed by connecting opposite ends of a motor 3 to be controlled to a power supply Vcc and an output terminal 2 of a control circuit 4, respectively, and connecting a resistor R between a terminal 1 of the control circuit 4 and the power supply Vcc. In this case, the terminal voltage of the motor is controlled so as to be equal to the sum voltage of a voltage drop $V_R$ across the resistor R generated by the in-flow current $I_1$ to the terminal 1 and a constant voltage generated by a voltage reference circuit provided within the control circuit 4. More particularly, it is such system that a counter electro-motive-force across the motor 3 is varied by a variation of a rotational speed occurring in response to an amount of loading upon the motor 3 is compared with the constant voltage generated from the voltage reference circuit, the in-flow current $I_1$ to the terminal 1 and the in-flow current $I_M$ to the motor 3 are varied within the control circuit 4 in accordance with the error signal produced as a result of the comparison, resulting in variation of the voltage drop $V_R$ across the resistor R, and thereby the terminal voltage across the motor 3 is varied in response to the variation of loading upon the motor 3 to control the rotational speed of the motor 3 to be constant. For instance, in the case where the loading upon the motor 3 becomes heavier, an in-flow current $I_M$ to the motor 3 is increased, the in-flow current $I_1$ to the terminal 1 of the control circuit 4 is also increased correspondingly, the terminal voltage across the motor 3 is raised by the increase of the voltage drop $V_R$ across the resistor R, and thereby a driving torque enough to offset the increment of the loading torque can be obtained to make the motor 3 rotate at predetermined constant speed.

Now, with reference to a practical example shown in FIG. 2, more detailed description will be made on a motor speed control circuit according to a current control system provided with a negative impedance in the prior art. In FIG. 2, a section 4 framed by a single dot chain line represents the control circuit having the same reference numeral shown in FIG. 1. The control circuit 4 comprises three sections consisting of a voltage reference circuit 6, an error amplifier (a comparator) 7 and an output circuit 8. The constant current source 5 is added to precisely adjust the rotational speed of the motor 3 by applying a constant current Icc to the resistor R. The voltage reference circuit 6 produces a constant voltage Vr across both the ends. In the comparator 7, a sum of the constant voltage Vr generated by said voltage reference circuit 6 and a voltage drop across a resistor R connected in series to the terminal 1, is compared with the voltage at the output terminal of the control circuit 4. The output circuit 8 is composed of a current mirror circuit (transistors $Q_2$ and $Q_3$) and a drive circuit including a transistor $Q_1$ for driving the input of the current mirror circuit.

Explaining first the operation in the normal state, that is, upon rotational control, the control circuit 4 operates in such manner that the motor 3 may be rotated at a constant speed while maintaining the terminal voltage across the motor 3 constant. The rotation speed and the terminal voltage are determined by the resistance of the resistor R, the constant voltage Vr across the voltage reference circuit 6, and the constant current $I_{CC}$ of the current source 5, through a closed loop, in which a difference between a reference voltage Va at one input terminal a of the comparator 7 and a control voltage Vb at the other input terminal b is detected by the comparator 7 and the difference output is applied to the drive transistor $Q_1$ to control the current mirror circuit in the output circuit 8.

Here, three principal factors of variations in temperature, power supply voltage and motor loading can be enumerated as factors which cause a rotational speed of a motor to vary. Among these factors, with regard to the variations in temperature and power supply voltage, they can be compensated for by employing such a circuit construction that the constant voltage generated by the voltage reference circuit 6 may be stable against these variations. Against the third factor of the variation in the motor loading, compensation is made by the effect of the so-called governer motor consisting of the control circuit 4, motor 3 and resistor R. More particularly, explaining the voltage relationship in the motor control circuit as shown in FIG. 2 where the voltages at the inputs a, b of the comparator 7 are designated by Va and Vb, respectively, with reference, first to FIG. 3(a) showing the state upon light load control, the two inputs a, b of the comparator 7 are balanced to each other by making a current Ic proportional to the motor inflow current $I_M$ flow through the resistor R connected to the terminal 1 of the control circuit 4 with the aid of the current mirror circuit in the output circuit 8. In this figure, $Ra \cdot I_M$ represents a voltage drop generated by the internal resistance Ra of the motor 3, Ea represents a counter electro-motive-force across the motor 3, $I_c \cdot R$ represents a voltage drop generated by the current $I_c$ across the resistor R whose resistance R is selected so as to fulfill the relation of $I_c \cdot R = I_M \cdot R_a$. $(I_{cc} + I_s)R$ represents a voltage drop across said resistor R generated by the currents $I_{cc}$ and $I_s$ flowing from the terminal 1 of the control circuit 4 to the constant current source 5 and the voltage reference circuit 6, respectively, and $V_r$ represents a constant voltage generated across the voltage reference circuit 6 in the control circuit 4. Now, if a heavy load is applied to the motor, then as shown in FIG. 3(b) the in-flow current $I_M$ to the motor 3 is increased, resulting in increase of the voltage drop $Ra \cdot I_M$. However, since the resistance R of the resistor R connected between the terminal 1 of the control circuit 4 and the power supply $V_{cc}$ is at a given ratio $I_M/I_C$ to the internal resistance Ra of the motor 3, the voltage drop across the resistor R is likewise increased. In other words, even if the motor 3 is heavily loaded, the voltage drop across the resistor R is increased to raise the terminal voltage across the motor 3 by detecting the inflow current $I_M$ to the motor 3, so that against the load variation the counter electro-motive-force of the motor can be maintained constant to keep the rotational speed constant.

Next, explaining the operation of the motor upon starting, in general in a DC motor the counter electro-motive-force upon starting is gradually increased from zero, so that at the moment of starting both the counter electro-motive-force $E_a$ and the motor current $I_M$ are zero, the transistor $Q_3$ is turned off and at the output terminal 2 of the control circuit 4 appears a voltage that is substantially equal the power supply voltage $V_{cc}$. This voltage serves as the voltage Vb at one input terminal b of the comparator 7. Since the power supply voltage $V_{cc}$ is applied to the other input terminal a of the comparator 7 through the resistor R and the voltage reference circuit 6, at the other input terminal a appears a voltage $V_a$ that is lower than the voltage $V_b$. Under such a condition, the two comparison inputs to the comparator 7 are $Va=V_{cc}-(V_R+V_r)$ and $Vb \approx V_{cc}$, respectively, and thus the difference is large. However, owing to the output of the comparator 7 in the unbalanced condition, the collector of the transistor $Q_3$ in the current mirror circuit becomes conducting, and the motor begins to be rotated by the current flowing through the collector of the transistor $Q_3$. On the other hand, the voltage $V_1$ at the terminal 1 of the control circuit 4 drops, upon maximum drive of the transistor $Q_3$, to a voltage value $V_1$ (min) determined by the circuit construction within the control circuit 4. Accordingly, the motor starting current $I_M$ which is made proportional to a part $I_c$ of the in-flow current to the control circuit 4 as described above, takes the following maximum value:

$$I_{M(max)}=k \cdot V_{cc} - V_{1(min)}/R$$

because $$I_{1(max)} = \frac{V_{cc} - V_{1(min)}}{R} = I_{cc} + I_{c(max)} + I_s,$$

$$\therefore I_{c(max)} = \frac{V_{cc} - V_{1(min)}}{R} \quad (I_{c(max)} >> I_{cc} + I_s),$$

and also
$$I_M = k \cdot I_c.$$

In the above equations, Ic represents a current proportional to $I_M$, which flows from the resistor R through the transistor $Q_2$ in the current mirror circuit, and $I_1$ represents a total current flowing through the resistor R. FIG. 3(c) shows the two comparison voltages $V_a$ and $V_b$ to the comparator 7 when the motor 3 is being accelerated by the maximum starting current as described above. However, under such condition, since the starting current characteristics of the motor 3 are determined simply by the circuit construction only almost regardless of the characteristics of the output transistor $Q_3$, it is impossible to give a sufficient initial starting torque of the motor 3.

Now one preferred embodiment of the motor speed control circuit according to the present invention will be described with reference to a circuit diagram in FIG. 4. In this figure, reference numeral 13 designates a motor, numeral 14, a control circuit, numeral 11, a terminal of the control circuit 14, numeral 12, an output terminal of the control circuit 14, reference character R, a series resistor connected between the terminal 11 and a power supply terminal $V_{cc}$ of 10–17V, numeral 15, a constant current source, numeral 16, a voltage reference circuit for generating a constant voltage between its input and output, numeral 17, a first voltage comparator formed of a differential amplifier, numeral 18, an output circuit section, and the functions and operations of these circuit components are almost the same as those of the circuit in the prior art shown in FIG. 2. In the control circuit 14 are further provided transistors $Q_4$ and $Q_5$, the input terminal b of the first comparator 17 being connected to the emitter of the transistor $Q_4$ via a resistor $R_x$, and the input terminal a of the first comparator 17, to the base of the transistor $Q_4$. The collector of the transistor $Q_5$ is connected to the emitter of the transistor $Q_4$, the base of the transistor $Q_5$, to the collector of the transitor $Q_4$, and the emitter of the transistor $Q_5$, to a junction between a resistor $R_1$ and the emitter of the transistor $Q_2$ in the current mirror circuit of the output circuit section 18. In such a modified circuit, upon starting of the motor 13, the unbalanced condition between the voltages at the two inputs a and b of the first comparator 17 is utilized, and if a voltage difference arises between the base and emitter of the transistor $Q_4$, then an additional current $I_x$ is made to flow through the resistor $R_1$ in the current mirror circuit by the second comparator circuit formed of the transistors $Q_4$ and $Q_5$. Thereby the base voltage of the transistors $Q_2$ and $Q_3$ are increased by the voltage of $R_1 \cdot I_x$, and at the same time the emitter current of the transistor $Q_3$ is also increased by the same increment. The increment $\Delta I_M$ of the motor current $I_M$ in this case will take the following value:

$$\Delta I_M = (R_1/R_2)I_x = k \cdot I_x \ (k = R_1/R_2)$$

Assuming now that the potential difference between the inputs a and b of the comparator 17 is 1.2 V, the resistance Rx is 50Ω, k is equal to 20, the current Ic is 30 mA and the power supply voltage Vcc is 6 V, then in contrast to the fact that in the prior art circuit shown in FIG. 2 a current exceeding 600 mA could not flow as a motor starting current due to the relation of $I_M = kIc$, in the modified circuit shown in FIG. 4, since a current $I_x = 10$ mA can be made to flow, $\Delta I_M = 200$ mA can be attained. That is, a total motor current $I_M = 800$ mA can be realized, and thus the motor current is increased by 30%.

It is to be noted that upon light loading (normal loading) of the motor, the second comparator circuit (transistors $Q_4$ and $Q_5$) operates in the above-described manner upon starting, but, upon steady operation after start, no current Ix is desired from the emitter of the transistor $Q_5$ due to its threshold value determined by the resistor Rx, and so, the motor speed control against the variation in normal loading is effected substantially by means of the first comparator 17 only. In addition, if a predetermined threshold value for starting the comparison operation of the second comparator of the transistors $Q_4$ and $Q_5$ and the resistor Rx is preset in such manner that, when the loading is so heavy that the operation of the first comparator circuit has saturated, the second comparator may begin to operate, then the load characteristics of the motor 13 upon heavy loading can be improved.

Figure 7A:
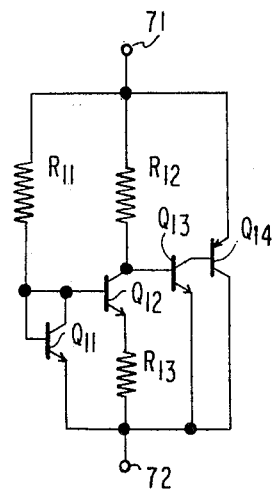
FIGS. 7(a) and 7(b) are circuit diagrams showing a voltage reference circuits usable in FIGS. 4, 5 and 6.

In the above embodiment, various modifications may be devised according to the present invention. For example, the second comparator of the transistor $Q_4$ and $Q_5$ may be replaced by a comparator of the differential amplifier type. The resistor Rx for determining the threshold voltage of the second comparator may be changed to a position between the base of the transistor $Q_4$ and the input terminal a of the first comparator 17. In place of the constant current source 15, a variable resistor having a resistance range of 50–200ω may be usable. Further, the voltage reference circuit 16 may be designed by the series conecton of the predetermined number of the forward biased P-N junctions. Another circuit design of the voltage reference circuit 16 is shown in FIG. 7(a). Referring to FIG. 7(a), the constant voltage is provided between the terminals 71 and 72, the series circuit of the resistor $R_{11}$ and the transistor $Q_{11}$ having a collector and a base connected each other, and the series circuit of the resistor $R_{12}$, the transistor $Q_{12}$ and the resistor $R_{13}$ are disposed between the terminals 71 and 72. The base of the transistor $Q_{12}$ is connected to the inter-connection point of the resistor $R_{11}$ and the transistor $Q_{11}$. The circuit further comprises the transistor $Q_{13}$ having a base connected to the collector of the transistor $Q_{12}$ and an emitter to the terminal 72, and the PNP transistor $Q_{14}$ having an emitter connected to the terminal 71, a base to the collector of the transistor $Q_{13}$ and a collector to the terminal 72. The detailed description of the operation is omitted, but this circuit is suitable for obtaining a small constant voltage having a selective temperature dependency between the terminals 71 and 72. The temperature dependency of the constant voltage can be controled by the resistance ratio of the resistors $R_{12}$ and $R_{13}$ and selected so as to ignore the temperature dependency of the operation of the whole motor speed control circuit. An example of the resistances of the resistors $R_{12}$ and $R_{13}$ are 6KΩ and 700Ω, respectively.

Figure 5:
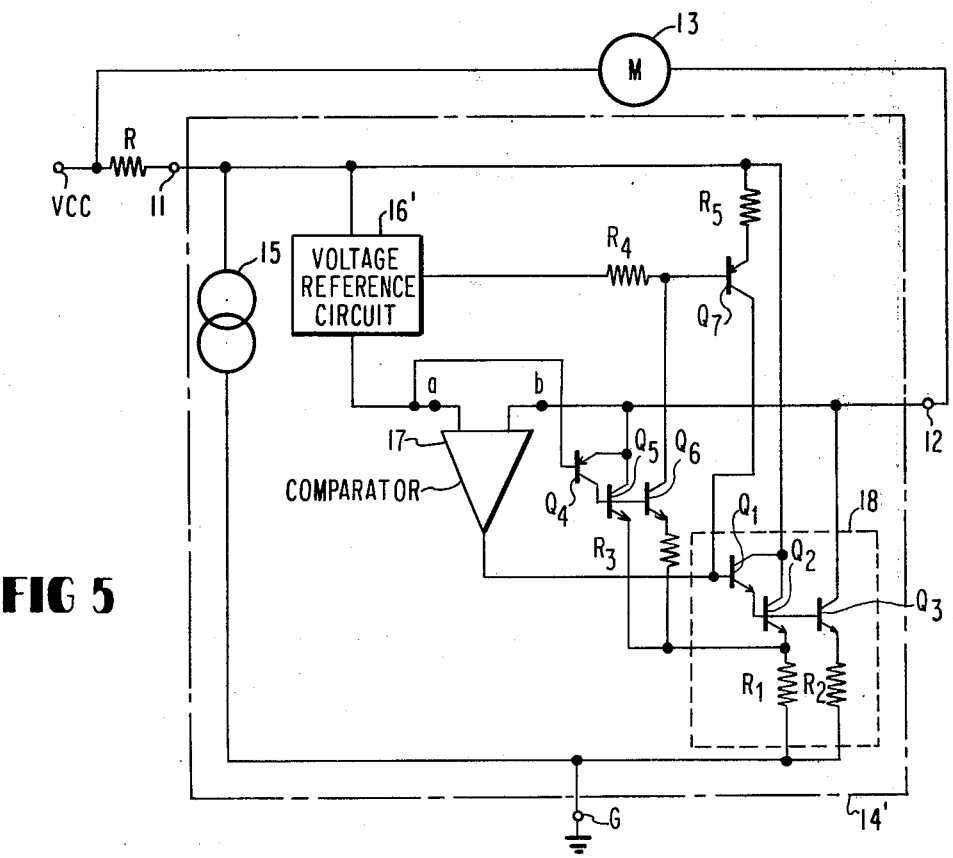
FIG. 5 is a circuit diagram showing a second preferred embodiment of the present invention.
Figure 7B:
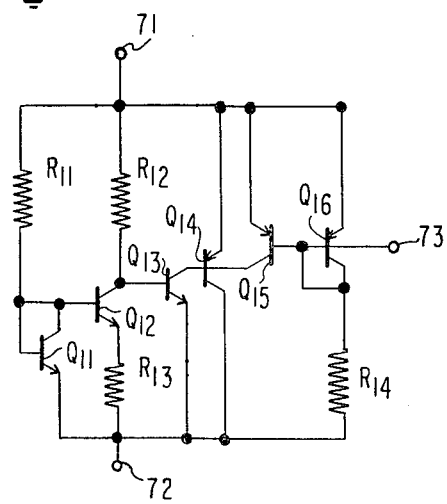

Referring now to FIG. 5, a second preferred embodiment of the present invention is constructed by a motor 13, a resistor R and a control circuit 14' connected same as the above-mentioned embodiment. The fundamental construction of the control circuit 14' is similar to the construction of the control circuit 14 shown in FIG. 4, and the same components are referenced by the same numerals as in FIG. 4. The base and emitter of a transistor $Q_4$ are connected to input terminals a and b, respectively, of a comparator 17, a base-collector path of a transistor $Q_5$ is connected between the collector and emitter of the transistor $Q_4$, and the emitter output of the transistor $Q_5$ is connected to a junction between a resistor $R_1$ and the emitter of a transistor $Q_2$ in an output circuit section 18. The collector of the transistor $Q_4$ is also connected to the base of the transistor $Q_6$, the emitter of which is connected via a resistor $R_3$ to the junction between the resistor $R_1$ and the emitter of the transistor $Q_2$, and the collector of which is connected to a base of a transistor $Q_7$. The base of a transistor $Q_1$ which is driven by the output of the comparator 17 is further driven by the collector output of the transistor $Q_7$. A resistor $R_5$ is connected between the emitter of the transistor $Q_7$ and the terminal 11, and a resistor $R_4$ is connected between the base of the transistor $Q_7$ and a fixed potential point within a voltage reference circuit 16'. In the case where the voltage reference circuit 16' is composed of a series connection in the forward direction of a plurality of diodes, then the resistor $R_4$ is connected to the junction between the first and second diodes in the series connection. Another voltage reference circuit 16' is shown in FIG. 7(b) described later. As described above, except for the addition of the transistors $Q_6$ and $Q_7$ and the associated resistors $R_3$, $R_4$ and $R_5$ to the first preferred embodiment, the functions of the remaining circuit components in FIG. 5 are the same as those of the corresponding circuit components designated by like reference numerals in FIG. 4. In this control circuit 14', when the voltage difference between the input terminals a and b is greater than the forward bias voltage of the base and emitter of the transistor $Q_4$, the output of the transistor $Q_4$ is amplified by the transistors $Q_5$ and $Q_6$, the amplified output is applied to the emitter of the transistor $Q_2$, and the variation in the collector current of the transistor $Q_6$ is applied via the transistor $Q_7$ to the base of the transistor $Q_1$. Thereby the drive of the transistors $Q_2$ and $Q_3$ is enhanced, and so, a further increasing starting current can be made to flow through the motor 13.

The voltage reference circuit shown in FIG. 7(b) may be used as the voltage reference circuit 16'. The circuit of FIG. 7(b) has terminals 71, 72 and 73 respectively connected to the terminal 11, the input terminal a of the comparator 17 and the resistor $R_4$. The transistors $Q_{11}$, $Q_{12}$, $Q_{13}$, $Q_{14}$ and the resistors $R_{11}$, $R_{12}$, $R_{13}$ are connected as shown in FIG. 7(a). The collector and base of the PNP transistor $Q_{15}$ are connected to the base and the emitter of the PNP transistor $Q_{14}$, and the base of the transistor $Q_{15}$ is connected to the base and the collector of the PNP transistor $Q_{16}$ and to the resistor $R_{14}$ and the terminal 73. The emitter of the PNP transistor $Q_{16}$ is connected to the terminal 71. This circuit may provide a constant voltage having a selective temperature coefficient between the terminals 71 and 72, and a forward biased base-emitter voltage between the terminals 71 and 73.

Figure 6:
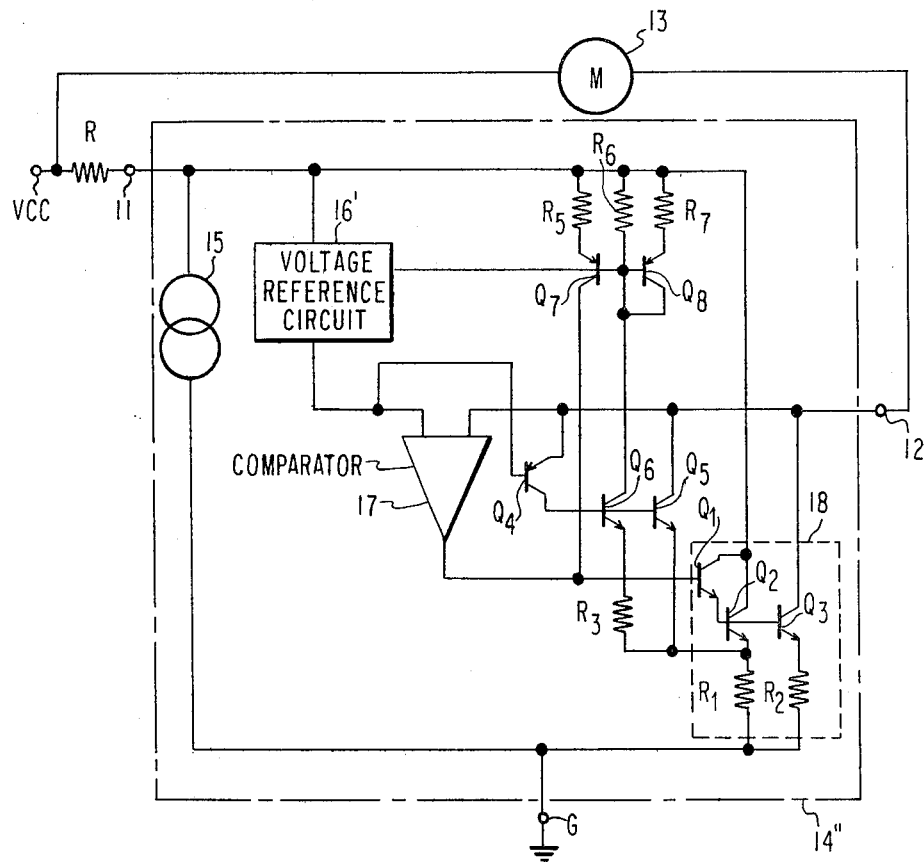
FIG. 6 is a circuit diagram showing a third preferred embodiment of the present invention.

A circuit diagram of a third preferred embodiment according to the present invention is shown in FIG. 6. This circuit has additional transistor $Q_8$ and resistors $R_6$ and $R_7$, compared to the circuit diagram of the above-described second preferred embodiment in FIG. 5. The transistor $Q_8$ has the base and the collector connected to each other and to the junction point of the resistor $R_6$, the base of the transistor $Q_7$, the voltage reference circuit 16' and the collector of the transistor $Q_6$, and the emitter connected to the resistor $R_7$. The resistors $R_6$ and $R_7$ are connected to the terminal 11. Thereby the variation in the voltage applied to the base of the transistor $Q_1$ can be further enlarged. The voltage reference circuit 16' may that shown in FIG. 7(b).

It is needless to say that the ground potential can be applied to the power source terminal Vcc and the power source having a negative polarity to the ground terminal G and that the polarity of the power source can be inverted together with the inversion of the conductivity type of all the transistors.

As will be apparent from the above description of the preferred embodiments, the present invention can precisely control the motor speed not only under a normal rotating condition of a motor, but also upon starting of the motor. Especially, upon starting of the motor, a large starting torque can be given momentarily to the motor and thereby improvements in the starting characteristics have been achieved. What is claimed is:

1. A combination comprising a first series connection of a motor and a first current source, a second series connection of a resistor and a second current source, said first and second series connections being arranged in parallel, a detector detecting a difference between a first voltage drop across said motor and a second voltage drop across said resistor and generating an output when a difference is detected between said first and second voltage drops, means for changing the currents supplied to said motor and said resistor by said first and second current sources, respectively, in response to said output of said detector, a comparator comprising the difference in said first and second voltage drops with a predetermined voltage value and generating an output when the difference between said first and second voltage drops is larger than said predetermined voltage, and means for enhancing the amount of said currents derived from said first and second current sources in response to said output of said comparator.

2. A motor unit provided with a rotation speed control system, comprising first and second power supply terminals, a resistor having one end connected to said first power supply terminal, a constant voltage source having two terminals and generating a constant voltage between said two terminals thereof, one of said terminals of said constant voltage source being coupled to the other end of said resistor, a first voltage comparator having a first input terminal coupled to the other terminal of said constant voltage source and a second input terminal and generating an output in response to the difference between the voltage at said first and second input terminals, a motor coupled between said first power supply terminal and said second input terminal of said first voltage comparator, a current mirror circuit having a first output terminal coupled to said other end of said resistor and a second output terminal coupled to said second input terminal of said first voltage comparator, currents supplied to said resistor and said motor by said current mirror circuit being changed in response to said output of said first voltage comparator, a second voltage comparator comprising said voltage at said first input terminal with that at said second input terminal of said first voltage comparator and generating an output when the difference between said voltages at said first and second input terminals of said first voltage comparator is larger than a predetermined value, and means for enhancing the current derived from said first and second output terminals of said current mirror circuit in response to said output of said second voltage comparator.

3. The motor unit as claimed in claim 2, wherein said second voltage comparator is inhibited from generating said output during a steady operation of said system.

4. The motor unit as claimed in claim 2 or 3, wherein the resistance of said resistor is equal to the internal resistance of said motor.

5. The system as claimed in claim 1, wherein said current mirror circuit comprises a sixth, a seventh and an eighth transistor and a fifth and a sixth impedance element, said sixth transistor having a base coupled to said output of said voltage comparator, said seventh transistor having a base and a collector connected to the emitter and the collector of said sixth transistor, respectively, and an emitter coupled to said second power supply terminal through said fifth impedance element, the collector of said sixth transistor being also connected to said first output terminal of said current mirror circuit, said eighth transistor having a collector connected to said second output terminal of said current mirror circuit, a base connected to the base of said seventh transistor and an emitter coupled to said second power supply terminal through said sixth impedance element, and the current derived from the emitters of said second and third transistors being supplied to the emitter of said seventh transistor.

6. A motor speed control circuit as claimed in claim 2, wherein said second voltage comparator is inhibited from generating an output current during a steady operation of said control circuit.

7. The system as claimed in claim 3 wherein said current generator circuit is a current mirror circuit having a first output terminal coupled to said other end of said resistor and a second output terminal coupled to said other end of said motor, said second voltage comparator causing an increase in the flow of current to said first output terminal and thereby an increase in the flow of current to said second output terminal when the two input voltages to said first comparator have a substantial difference.

8. The system as claimed in claim 7 wherein said second voltage comparator comprises first and second bipolar transistors, the base of said first transistor being connected to said other end of said constant voltage source, the emitter of said first transistor and the collector of said second transistor being connected together and said other end of said motor, the collector of said first transistor being connected to the base of said second transistor and an enhancing current being derived from the emitter of said second transistor, said enhancing current being supplied to said current generator.

9. The system as claimed in claim 8 wherein said constant voltage source has a reference voltage terminal and said second voltage comparator additionally comprises third and fourth bipolar transistors and second and third resistors, said third transistor having a common base connection with said second transistor and a collector connected to the base of said fourth transistor and to said reference voltage terminals the emitter of said third transistor being connected through said second resistor to the emitter of said second transistor, the emitter of said fourth transistor being connected to said one end of said constant voltage source through said third resistor, and the collector of said fourth transistor being connected to the output of said first voltage comparator.

10. The system as claimed in claim 9 wherein said second voltage comparator additionally comprises a fifth bipolar transistor and fourth and fifth resistors, the base of said fifth transistor being connected in common to the base of said fourth transistor and through said fourth resistor to said one end of said constant voltage source, the emitter of said fifth transistor being connected through said fifth resistor to said one end of said constant voltage source, and the collector and base of said fifth transistor being connected together.

11. The system as claimed in claim 3 wherein said second voltage comparator is inhibited from generating an output current during a steady operation of said system.

12. A system comprising a power supply having first and second terminals, a motor having one end connected to said first power supply terminal, a resistor having one end connected to said first power supply terminal and having a resistance proportional to the internal resistance of said motor, a constant voltage source generating a constant voltage between its one and the other end and having a reference voltage terminal, said one end of said constant voltage source being connected to the other end of said resistor, a voltage comparator comparing the voltage at said other end of said constant voltage source with the voltage at the other end of said motor and generating an output in response to the difference between said voltages, a current mirror circuit having a first output terminal coupled to said other end of said resistor and a second output terminal coupled to said other end of said motor, currents supplied from said first and second output terminal of said current mirror circuit being changed in response to said output of said voltage comparator, a first transistor having a base coupled to said other end of said constant voltage source and an emitter connected to said other end of said motor, a second transistor having a base and a collector connected to the collector and emitter of said first transistor, respectively, a third transistor having a base connected to the base of said second transistor and an emitter coupled to the emitter of said second transistor through a first impedance element, a fourth transistor having a base coupled to said reference voltage terminal and an emitter coupled to said other end of said resistor through a second impedance element and a collector coupled to the output terminal of said voltage comparator, a fifth transistor having a base and a collector connected commonly to the base of said fourth transistor and an emitter coupled to said other end of said resitor through a third impedance element, said connecting point of the base and collector of said fifth transistor being also connected to the collector of said third transistor, a fourth impedance element inserted between said other end of said resistor and the bases of said fourth and fifth transistors, and means for supplying a current derived from the emitters of said second and third transistors to said current mirror circuit.

* * * * *

UNITED STATES PATENT AND TRADEMARK OFFICE
CERTIFICATE OF CORRECTION

PATENT NO. : 4,227,127
DATED : October 7, 1980
INVENTOR(S) : Hirokazu FUKAYA et al.

It is certified that error appears in the above—identified patent and that said Letters Patent is hereby corrected as shown below:

Column 1, line 4, insert -- BACKGROUND OF THE INVENTION -- .

Column 4, line 31, after "reference" delete "," .

Column 5, line 52, delete "of" and insert -- to -- .

Column 6, line 44, delete "desired" and insert -- derived -- .

Column 7, line 29, after "connected" insert -- the -- .

Column 8, line 64, delete "comprising" and insert -- comparing -- .

Column 9, line 25, delete "comprising" and insert -- comparing -- .

Signed and Sealed this

Twenty-fourth Day of March 1981

[SEAL]

Attest:

RENE D. TEGTMEYER

Attesting Officer    Acting Commissioner of Patents and Trademarks